United States Patent
Zhang et al.

(10) Patent No.: US 9,252,942 B2
(45) Date of Patent: Feb. 2, 2016

(54) METHOD AND SYSTEM FOR SECURE MULTIPARTY CLOUD COMPUTATION

(75) Inventors: Xinwen Zhang, San Jose, CA (US); Qingji Zheng, San Antonio, TX (US); Antontius Kalker, Mountain View, CA (US); Guoqiang Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 445 days.

(21) Appl. No.: 13/449,216

(22) Filed: Apr. 17, 2012

(65) Prior Publication Data

US 2013/0275752 A1 Oct. 17, 2013

(51) Int. Cl.
*H04L 29/06* (2006.01)
*H04L 9/00* (2006.01)

(52) U.S. Cl.
CPC ............. *H04L 9/008* (2013.01); *H04L 2209/46* (2013.01)

(58) Field of Classification Search
CPC ......... H04L 9/088; H04L 9/085; H04L 9/008; H04L 63/06; H04L 2209/88; H04L 9/32; G06F 21/6218
See application file for complete search history.

(56) References Cited

U.S. PATENT DOCUMENTS

| | | | |
|---|---|---|---|
| 7,792,300 B1 * | 9/2010 | Caronni | 380/277 |
| 8,583,911 B1 * | 11/2013 | Miller | 713/150 |
| 2006/0274899 A1 * | 12/2006 | Zhu et al. | 380/281 |
| 2007/0140479 A1 * | 6/2007 | Wang et al. | 380/30 |
| 2009/0116649 A1 * | 5/2009 | Perlman | 380/277 |
| 2013/0097417 A1 * | 4/2013 | Lauter et al. | 713/150 |

FOREIGN PATENT DOCUMENTS

WO   WO 2011051400 A1 *   5/2011

OTHER PUBLICATIONS

International Search Report dated Oct. 28, 2013 in connection with International Patent Application No. PCT/US2013/037026.
Written Opinion of the International Searching Authority dated Oct. 28, 2013 in connection with International Patent Application No. PCT/US2013/037026.
Gilad Asharov, et al., "Multiparty Computation with Low Communication, Computation and Interaction via Threshold FHE", Jan. 19, 2012, 16 pages.
Giuseppe Ateniese, et al., "Improved Proxy Re-encryption Schemes with Applications to Secure Distributed Storage", ACM Transactions on Information and System Security, vol. 9, No. 1, Feb. 2006, p. 1-30.
Adriana Lopez-Alt, et al. "Cloud-Assisted Multiparty Computation from Fully Homomorphic Encryption", Dec. 7, 2011, 44 pages.

* cited by examiner

*Primary Examiner* — Fatoumata Traore
*Assistant Examiner* — Carlton Johnson

(57) ABSTRACT

One embodiment of the present invention provides a system for performing secure multiparty cloud computation. During operation, the system receives multiple encrypted datasets from multiple clients. An encrypted dataset associated with a client is encrypted from a corresponding plaintext dataset using a unique, client-specific encryption key. The system re-encrypts the multiple encrypted datasets to a target format, evaluates a function based on the re-encrypted multiple datasets to produce an evaluation outcome, and sends the evaluation outcome to the multiple clients, which are configured to cooperatively decrypt the evaluation outcome to obtain a plaintext evaluation outcome.

12 Claims, 5 Drawing Sheets

METHOD AND SYSTEM FOR SECURE MULTIPARTY CLOUD COMPUTATION

BACKGROUND

1. Field

This disclosure is generally related to multiparty cloud computation. More specifically, this disclosure is related to a method and a system that ensures data security in multiparty cloud computation.

2. Related Art

Cloud computation has been gaining popularity in recent years among enterprise users and individual users because, ideally, it can provide almost unlimited computation capability and storage space by virtualizing vast amounts of physical computing resources and integrating them together. The ever-increasing need for storage capacity and the lowered management cost have made it attractive for individuals and enterprises to outsource their data storage need to the cloud. However, outsourcing computation to the cloud remains a challenge due to security concerns.

SUMMARY

One embodiment of the present invention provides a system for performing secure multiparty cloud computation. During operation, the system receives multiple encrypted datasets from multiple clients. An encrypted dataset associated with a client is encrypted from a corresponding plaintext dataset using a unique, client-specific encryption key. The system re-encrypts the multiple encrypted datasets to a target format, evaluates a function based on the re-encrypted multiple datasets to produce an evaluation outcome, and sends the evaluation outcome to the multiple clients, which are configured to cooperatively decrypt the evaluation outcome to obtain a plaintext evaluation outcome.

In a variation on this embodiment, re-encrypting the multiple encrypted datasets involves a homomorphic encryption scheme.

In a variation on this embodiment, the system receives a set of re-encryption keys and uses a particular re-encryption key corresponding to the client to re-encrypt the encrypted dataset associated with the client.

In a further variation, the client-specific encryption key is a public key selected from a public/private key pair, and the re-encryption key corresponding to the client is generated using a private key selected from the public/private key pair and a target public key published by a trusted third party.

In a further variation, the target public key corresponds to a target private key, and each client receives a share of the target private key.

In a further variation, the multiple clients are configured to cooperatively decrypt the evaluation outcome using shares of the target private key.

In a variation on this embodiment, the function includes a multiplication and/or an addition.

One embodiment of the present invention provides a system for performing secure multiparty cloud computation. During operation, a client of a cloud computing system obtains an encrypted dataset from a plaintext dataset using a unique encryption key, stores the encrypted dataset at the cloud computing system, generates a re-encryption key, and transmits the re-encryption key to the cloud computing system, thereby allowing the cloud computing system to re-encrypt multiple encrypted datasets received from multiple clients and generate an evaluation result of a function based on the re-encrypted multiple datasets. The client further receives the evaluation result from the cloud computing system, and cooperates with other clients to decrypt the evaluation result to obtain a plaintext evaluation result.

In a variation on this embodiment, the unique encryption key is a public key selected from a public/private key pair.

In a further variation, the client receives, from the trusted third party, a share of a target private key corresponding to the target public key.

In a variation on this embodiment, the client cooperate with other clients to decrypt the evaluation result by: computing a portion of a decrypted result, receiving portions of the decrypted result from the other clients, and computing the plaintext evaluation result based on the computed portion and the portions received from the other clients.

In a variation on this embodiment, the function includes a multiplication and/or an addition.

In a variation on this embodiment, the re-encryption key is a homomorphic encryption key.

DETAILED DESCRIPTION

Figure 1:
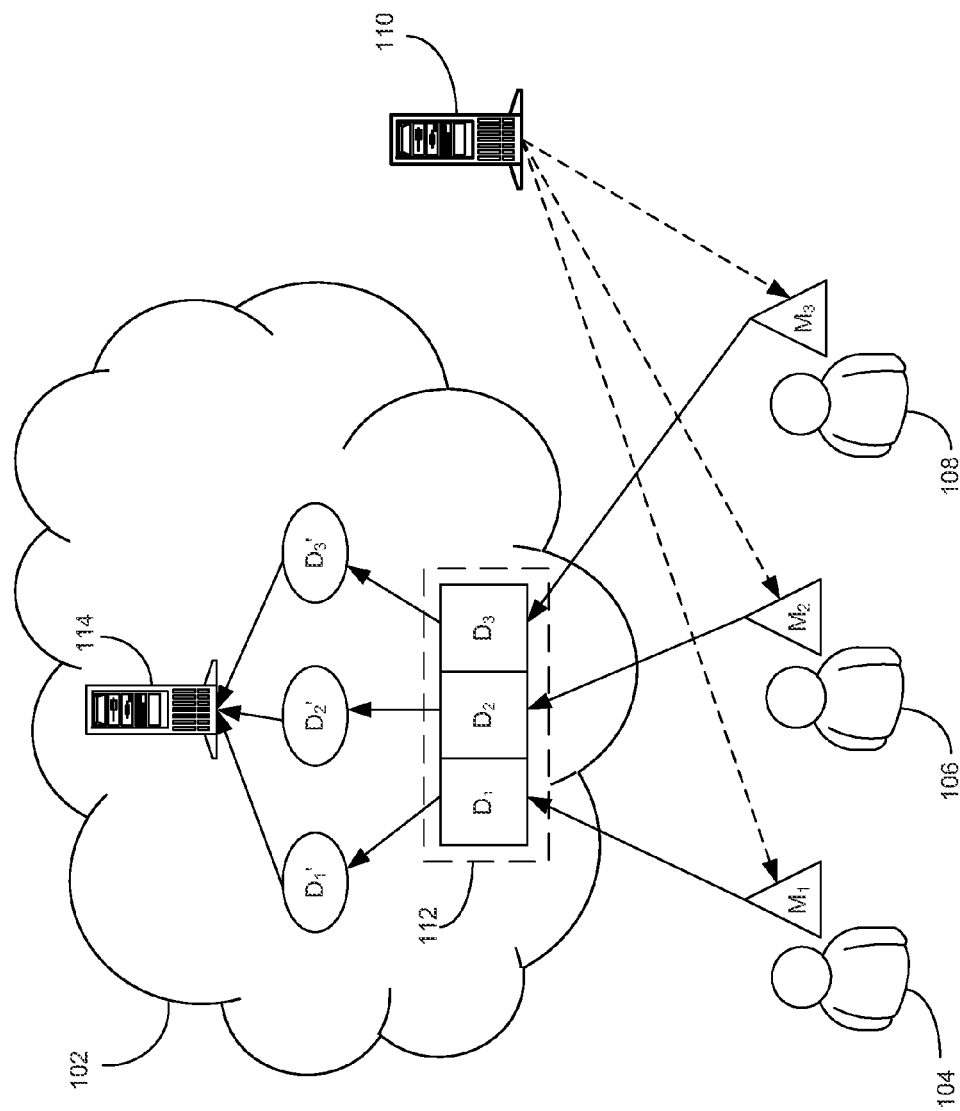
FIG. 1 presents a diagram illustrating an exemplary system for performing secure multiparty cloud computation (MCC), in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a method and a system that ensures data security in multiparty cloud computation (MCC). The MCC refers to a cloud computing problem where the cloud performs computations using data originating from multiple data owners. The diverse ownership of the data makes maintaining data privacy among the owners and the cloud a challenge. In a secure MCC system, multiple clients store their own, individually encrypted data in a cloud, and outsource computations based on the stored data to the cloud. The system ensures that the data owners maintain privacy of their own data and that the cloud does not gain knowledge of the data as well as the computation result. To do so, the system transforms or re-encrypts the private data stored in the cloud before the cloud performs the computation. More specifically, the transformation or re-encryption of the private data involves a public/private key pair obtained from a trusted third party. The trusted third party generates the public/private key pair, publishes the public key, and distributes a share of the private key to each data owner. A data owner generates a re-encryption key using the public key and its own private key, which corresponds to the public key used by the data owner to encrypt the data before sending the data to the cloud. The re-encryption keys generated by the multiple data owners are sent to the cloud, which then re-encrypts the private data from the data owners using corresponding re-encryption keys. Subsequently, the cloud performs the computation on the re-encrypted data. Because the computation is performed on the re-encrypted data, the cloud has no knowledge of the correspondence between the computation result and the private data. The computation result is then sent back to the data owners. Because each data owner was given a share of the private key, decryption of the result requires the cooperation of all data owners.

In this disclosure, the term "cloud" typically refers to any group of networked computers capable of delivering computing services (such as computations, applications, data access, and data management and storage resources) to end users. This disclosure does not limit the type (such as public or private) of the cloud as well as the underlying system architecture used by the cloud.

Multiparty Cloud Computation (MCC)

The increasing popularity of the cloud has prompted individuals and enterprises to outsource not only their data storage but also data computation to the cloud. Hence, a cloud sometimes needs to perform computations using data originating from multiple data owners, which can raise the issue of how to maintain data privacy among the data owners and the cloud. This problem is referred as multiparty cloud computation (MCC). For example, the credit bureaus (including Equifax, TransUnion, and Experian) maintain a vast amount of consumer credit records (in encrypted forms) in a cloud. When a bank wants to evaluate the credit of a particular customer, the bank wants to obtain the mean value of the credit scores from all three credit bureaus. To calculate the mean value, the cloud obtains credit records for the particular customer from data stored by each credit bureau, evaluates a credit score corresponding to each credit bureau, and calculates the mean value. Note that the computation of the mean value of the credit scores requires input from the bank (consumer identity information, such as Social Security number) and from all three credit bureaus (consumer credit history and their own credit-score calculating algorithms). The bank and the credit bureaus want to keep their data private (for example, one credit bureau does not want to reveal its credit-score calculating algorithm to a different credit bureau or to the bank). In addition, although the bank and the credit bureaus can obtain the calculated mean credit score, such information needs to be kept away from the cloud.

Another MCC example involves medical records stored in the cloud. Healthcare service providers (such as doctors or hospitals) maintain their patient records (in encrypted form) in the cloud. A research group would like to estimate the trend of a certain disease by analyzing the symptoms from a large number of patients. The healthcare service providers are reluctant to share their databases with the research group, but would allow the group to perform certain evaluations on their data. To do so, the research group needs to describe the estimation model to the cloud and let the cloud perform the evaluation based on the model.

The MCC problem can be described as follows: k clients, $p_1, \ldots, p_k$, store their private data, $x_1, \ldots, x_k$ in encrypted form in the cloud. These clients wish to cooperate in order to efficiently and securely compute a joint function, $f(x_1, \ldots, x_k)$, which requires input from the multiple clients. More particularly, the clients wish to utilize the computation capacity of the cloud. To meet the efficiency requirement, a solution for the MCC problem needs to ensure that the communication overhead between the clients and the cloud is minimized, thus ruling out certain trivial solutions where the clients download their data from the cloud, decrypt them to obtain the original data, and then adopt known secure multiparty computation protocols with cloud aid. Because downloading data from the cloud imposes heavy communication overhead, it negates the benefit of the cloud. In addition, such an approach does not take advantage of the computation capacity of the cloud.

To meet the security requirement, the MCC solution needs to preserve the data privacy among the clients and the cloud. Such data privacy means that each client maintains its data privacy by encrypting its data before storing the data to the cloud, that the evaluation result of the joint function is kept private from the cloud, and that each client cannot learn anything other than the evolution result of the joint function and, possibly, any information inherently revealed by the evaluation result. Another trivial solution for MCC is to use a static normalized encryption format that does not require re-encryption for new function evolutions. However, this solution is not sufficiently secure. Moreover, a static encryption format cannot provide threshold decryption for a dynamic set of clients.

Under the MCC environment, the security threat mostly originates from misbehavior of the clients and the cloud. The secure MCC protocol proposed here is based on, at least in some embodiments of the invention, a computationally bounded adversary model, which is a semi-honest but curious model. This adversary model can specify the behaviors of the clients and the cloud as follows: 1) the clients and the cloud execute the protocol's specification exactly; 2) the cloud provides reliable storage service; namely, it does not modify or destroy the stored client data; 3) the inputs of the evaluation function are provided appropriately (some techniques, such as the keyword search, can be adopted to facilitate the cloud in preparing datasets for the function); 4) the cloud is curious and makes great effort to infer something from the execution; and 5) while the client may be reluctant to leak any information related to its own data stored in the cloud, it desires to learn information from other clients' data. In addition, the secure MCC protocol can rely on a trusted third party that is fully trusted by all clients and the cloud and responsible for issuing keys and managing key distribution as needed.

FIG. 1 presents a diagram illustrating an exemplary system for performing secure MCC, in accordance with an embodiment of the present invention. Secure MCC system 100 includes a cloud 102; a number of clients, such as clients 104, 106, and 108; and a trusted third party 110. Cloud 102 can be any network of computers that delivers computing services (such as computations, applications, data access, and data management and storage resources) to end users. Examples of cloud 102 include, but are not limited to: Amazon Web Service (AWS), Microsoft Windows Azure, and networks of computers based on content-oriented networking architecture (CONA) or information-centric networking (ICN). Cloud 102 includes a storage-service layer 112 and a computation-service layer 114. Note that, although in FIG. 1 storage-service layer 112 and computation-service layer 114 are included in cloud 102, in practice, they may or may not be provided by the same cloud provider. In one embodiment, the storage service is provided by one cloud provider, whereas the computation service is provided by a different cloud provider. Moreover, the owner of cloud 102 may be different from providers of the storage service and/or the computation service. Clients 104, 106, and 108 are owners of original plaintext data $M_1$, $M_2$, and $M_3$, respectively. Trusted third party 110 is a party that is trusted by cloud 102 and clients/data owners 104-108. More particularly, trusted third party 110 is independent from cloud 102 and clients 104-108, and it is responsible for key management when considering the cryptographic primitives.

In one embodiment, clients 104-108 not only outsource their data to cloud 102, but also outsource the computation functions, which can be any models that analyze or estimate the data, to cloud 102. Cloud 102 hosts the private data (data owned by clients) in an isolated manner, meaning individual clients' data are segregated from each other, and cloud 102 provides a certain level of reliability (e.g., satisfying certain service-level agreements (SLAs)). Cloud 102 performs the computation (evaluates the functions) for clients 104-108, and returns the computation result to clients 104-108 without comprehension of the private data and the computation result.

One basic assumption for secure MCC system 100 is that the communication channels within the system, such as communication channels among cloud 102, clients 104-108, and trusted third party 110, are secure and authenticated.

Clients 104, 106, and 108 use services provided by storage-service layer 112 to store encrypted versions of their plaintext data at cloud 102. For example, client 104 encrypts plaintext data $M_1$ into ciphertext data $D_1$, and stores $D_1$ in cloud 102. Similarly, ciphertext data $D_2$ and $D_3$, which correspond to plaintext data $M_2$ and $M_3$, respectively, are also stored in cloud 102. Trusted third party 110 provides parameters that can be used by clients 104-108 to encrypt their plaintext data. In one embodiment, trusted third party 110 provides each client with a unique public/private key pair. For example, client 104 receives a public/private key pair ($PK_1$, $SK_1$).

Because private data stored in cloud 102 is encrypted, utilizations of these private data are limited due to randomness of the encrypted data. Various approaches have been proposed for the purpose of data usage without undermining data privacy. Among them homomorphic encryption has been one of the critical techniques to achieve this object. However, a simple adoption of the homomorphic encryption scheme does not solve the MCC problem, because the homomorphic encryption scheme requires the ciphertext under evaluation to be encrypted with the same public/private keys. In MCC, the private data are provided by multiple different clients using different public/private keys. Therefore, in order to use the homomorphic encryption scheme to solve the MCC problem, certain adaptations are needed. In one embodiment, the homomorphic encryption scheme is combined with a proxy re-encryption process to solve the secure MCC problem. This approach, referred to as a "homomorphic threshold proxy re-encryption" scheme, has a number of desirable properties. The homomorphic encryption ensures homomorphism, which means that one can obtain the ciphertext of an evaluation result of two inputs by evaluating the ciphertext of the two inputs without decryption of the ciphertext. For example, given $c_1$ and $c_2$ as ciphertext of plaintext $m_1$ and $m_2$, respectively, obtained using homomorphic encryption, the ciphertext of certain functions (such as $m_1+m_2$ and $m_1 \cdot m_2$) can be obtained by evaluating $c_1$ and $c_2$ directly without decrypting them to plaintext form. The proxy re-encryption process uses a proxy re-encryption key to transfer a ciphertext of one user to a ciphertext of a target user. As shown in FIG. 1, ciphertext data $D_1$, $D_2$ and $D_3$ are re-encrypted to ciphertext data $D'_1$, $D'_2$, and $D'_3$, respectively before being evaluated by computation-service layer 114. Moreover, the threshold decryption requires all clients to work together to decrypt the ciphertext of the evaluation output.

Figure 2:
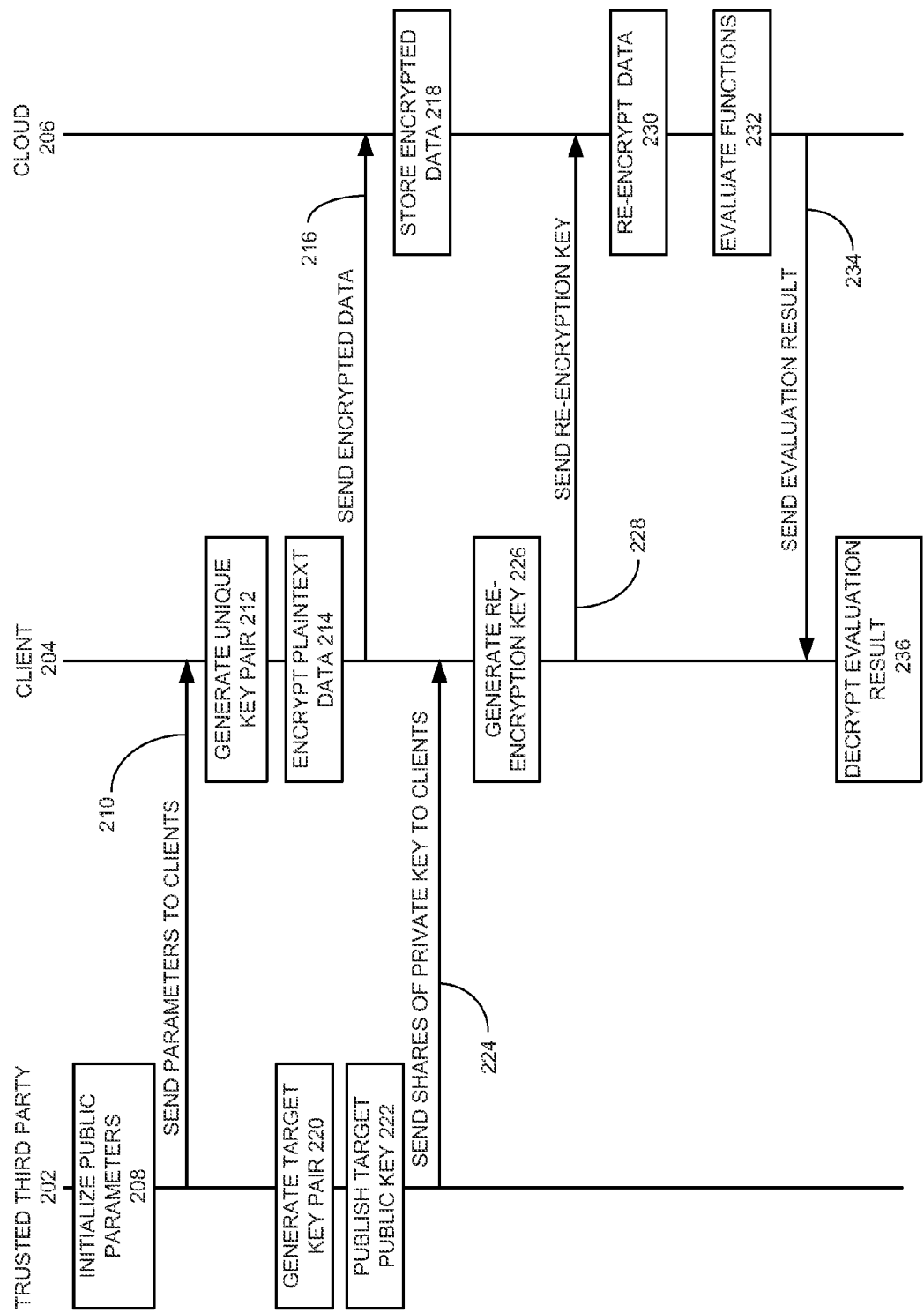
FIG. 2 presents a time-space diagram illustrating an exemplary secure MCC process, in accordance with an embodiment of the present invention.

FIG. 2 presents a time-space diagram illustrating an exemplary secure MCC process, in accordance with an embodiment of the present invention. During a setup phase, trusted third party 202 initializes a set of public parameters that will be shared by all clients (operation 208). In one embodiment, trusted third party 202 invokes a setup algorithm, Setup($1^l$), that uses a given security parameter $1^l$ to output the global parameter param, which includes the specification of message space, plaintext space, and ciphertext space. The setup algorithm can be described as follows: Let p be an l-bit prime, and G and $G_T$ be two cyclic groups of order p; a bilinear group e is defined as e: G×G→$G_T$. Let g be the generator randomly selected from the group G, and Z=e(g, g). The message space is $G_T$.

Trusted third party 202 sends global parameters to all clients, such as client 204, to allow param to be included as input in all other algorithms used by the system (operation 210). The setup phase continues when each client, such as client 204, invokes a key-generation algorithm, KeyGen, to generate a unique public/private pair (operation 212). In one embodiment, client i selects $\alpha_i$ from $Z^*_p$ uniformly at random to get a public key, $PK_i=g^{\alpha_i}$, and a corresponding private key, $SK_i=\alpha_i$. The rest of the setup phase includes each client encrypting its own plaintext data with the generated public key (operation 214), and sending the ciphertext data to cloud 206 (operation 216). For example, client i encrypts plaintext data $M_i$ with the public key $PK_i$ to obtain ciphertext $C_i$, and then outsources $C_i$ to cloud 206. In one embodiment, given a message $M_i \in G_T$, client i selects $r_i$ from $Z^*_p$ uniformly at random and generates ciphertext $D_i=(C_{i1}, C_{i2})$ as: $C_{i1}=PK_i^{r_i}$ and $C_{i2}=Z^{r_i}M_i$. Cloud 206, in turn, stores encrypted data received from the clients (operation 218). In one embodiment, data received from different clients are stored separately by cloud 206. The clients may or may not maintain a copy of their original plaintext data. In one embodiment, client 204 destroys its original plaintext data after sending the corresponding ciphertext data to cloud 206. When client 204 needs the data, it retrieves the ciphertext data and invokes a Dec algorithm. In one embodiment, given the ciphertext $D_i=(C_{i1}, C_{i2})$ under the public key $PK_i$, client i decrypts it to obtain plaintext message $M_i$ as $M_i=C_{i2}/e(C_{i1}, g^{1/\alpha_i})=Z^{r_i}M/Z^{r_i}$.

In order to facilitate the subsequent MCC evaluation, during a preparation phase, trusted third party 202 invokes a target-key generation algorithm, ThKeyGen(k), to generate a target public/private key pair, (SPK, SSK) (operation 220). Parameter k is the expected number of secret shares. Here, k is the number of clients involved in the MCC evaluation. The generated target private key SSK is divided into k shares (SSK={$SSK_1$, . . . , $SSK_k$}), with which k clients together can decrypt a ciphertext encrypted with the corresponding public key. Trusted third party 202 publishes the target public key SPK (operation 222), and distributes shares of the target private key SSK to clients, including client 204 (operation 224). In one embodiment, the target public key SPK is generated as SPK=$g^{\alpha_0}$, and the target private key SSK is generated using the following procedure: Given $s(x)=\Sigma_{i=0}^{i=k}b_0x^i$, where $b_0=1/\alpha_0$ and $b_i(1 \le i \le k)$ are selected from $\{1, \ldots, p-1\}$ uniformly at random, then $SSK_i=(i, s(i))$. Here, without loss of generality, it is assumed that $k \ge 2$.

Based on the published target public key SPK and its own private key, each client invokes a ProKeyGen($\alpha_i$, SPK) algorithm to generate a re-encryption key, which is also called a proxy key (operation 226). In one embodiment, client i generates a re-encryption key $RK_i$ using its private key $SK_i=\alpha_i$ and the published target public key SPK=$g^{\alpha_0}$, such that $RK_i=SPK^{1/\alpha i}$. Each client, such as client 204, then sends its generated re-encryption key to cloud 206 (operation 228).

The preparation phase continues when cloud 206 invokes a ProEnc (C, $RK_i$) algorithm, which re-encrypts ciphertext C using re-encryption key $RK_i$ and outputs C', on the encrypted data stored for the multiple clients (operation 230). In one embodiment, given the ciphertext data $D_i=(C_{i1}, C_{i2})$ belonging to client i and a re-encryption key $RK_i=SPK^{1/\alpha i}$, cloud 206 transforms ciphertext $D_i=(C_{i1}, C_{i2})$ to $D'_i=(C'_{i1}, C'_{i2})$ as: $C'_{i1}=e(C_{i1}, R_{ki})=e(C_{i1}, SPK^{1/\alpha i})$ and $C'_{i2}=C_{i2}$. Note that the re-encryption of the clients' ciphertext data serves two purposes. First, the re-encryption transforms ciphertext from the different clients to a common format that is suitable for the subsequent homomorphic evaluation. Second, the way the re-encryption key is constructed ensures that the decryption of the evaluation result is restricted to a pre-selected cooperative set of clients.

Once cloud 206 finishes re-encryption of the clients' ciphertext data, the system is ready for the evaluation phase, where cloud 206 invokes a HomEval algorithm to evaluate a function $f$ with inputs $D'_i, \ldots, D'_k$ (operation 232). Note that the ciphertext of $f(M_1, \ldots, M_k)$ can be obtained by evaluating $f(D'_1, \ldots, D'_k)$. For example, given two ciphertext s $D'_1=(C'_{11}, C'_{12})$ and $D'_2=(C'_{21}, C'_{22})$ corresponding to the plaintext messages $M_1$ and $M_2$, respectively, cloud 206 can obtain the ciphertext of an multiplication operation on $M_1$ and $M_2$ ($M_1 \cdot M_2$) by evaluating ciphertexts $D'_1$ and $D'_2$. In one embodiment, the ciphertext of $M_1 \cdot M_2$ is denoted as ($C'_1, C'_2$), where $C'_1=C'_{11} \cdot C'_{21}$ and $C'_2=C'_{12} \cdot C'_{22}$. Note that other types of functions can be decomposed as combinations of a number of additions and multiplications.

Cloud 206 then sends the evaluation output to the clients, including client 204, to allow all clients to cooperatively decrypt the evaluation output (operation 234). In the decryption phase, each client invokes a ThDec algorithm to decrypt the evaluation output using its secret share of the target private key in order to obtain the plaintext evaluation result (operation 236). In one embodiment, given the ciphertext ($C'_1, C'_2$) under the target public key $SPK=g^{\alpha 0}$, the decryption can be done with the cooperation of the k clients using the following procedure: Client i computes $w_i=C'_1{}^{s(i)}$, and sends $w_i$ to all other clients. Each client receives the corresponding w from all other clients, and decrypts the ciphertext of the evaluation result to obtain the plaintext evaluation result M as $$M = C'_2 \bigg/ \prod_{i=1}^{i=k} (w_i)^{\lambda_i},$$

where $$\lambda_i = \prod_{j=1}^{j=k, j \neq i} \frac{j}{j-i}.$$

Note that M cannot be computed if one or more $w_i$ is missing. In other words, all clients need to be involved in the computation of M.

Figure 3:
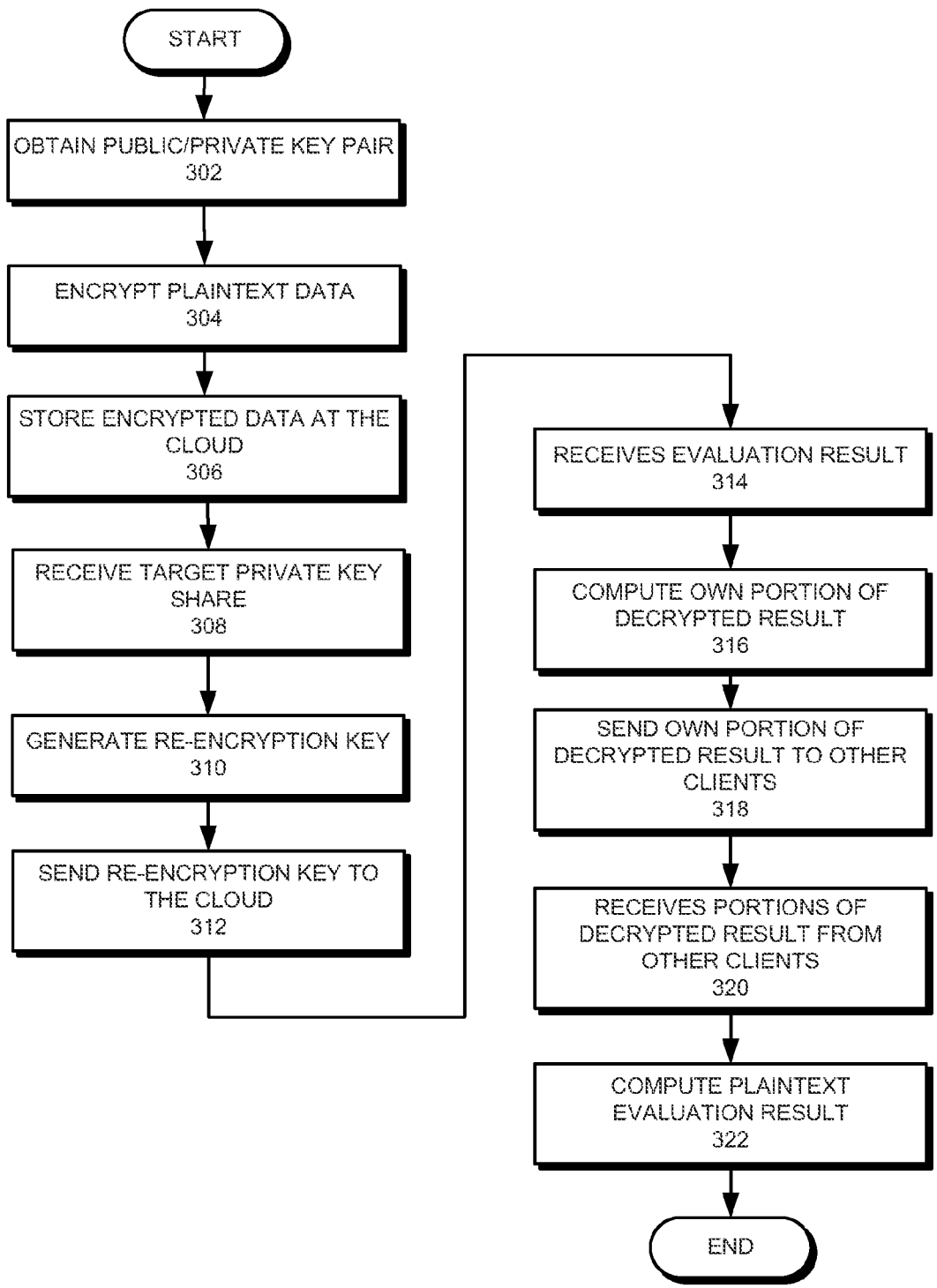
FIG. 3 presents a diagram illustrating an exemplary secure MCC process performed by a client, in accordance with an embodiment of the present invention.

FIG. 3 presents a diagram illustrating an exemplary secure MCC process performed by a client, in accordance with an embodiment of the present invention. During operation, the client obtains a public/private key pair using parameters received from a trusted third party (operation 302), encrypts its plaintext data using the obtained public key (operation 304), and stores the encrypted data at the cloud (operation 306). The client receives a share of a target private key from the trusted third party (operation 308). Note that the corresponding target public key is published by the trusted third party. The client then generates a re-encryption key using the published target public key and its own private key (operation 310), and sends the generated re-encryption key to the cloud (operation 312). The re-encryption keys sent from the multiple clients enable the cloud to re-encrypt the clients' stored data and to evaluate a joint function on the re-encrypted data. Subsequent to the cloud performing the function evaluation, the client receives the evaluation result from the cloud (operation 314). Because the evaluation is performed on the re-encrypted data, decryption is needed to obtain the plaintext result. To do so, the client first computes its own portion of the decrypted result using its secret share of the target private key (operation 316), and then sends its portion of the decrypted result to all other clients (operation 318). In addition, the client receives other portions of the decrypted result from all other clients (operation 320), and computes the final plaintext result based on its own portion of the decrypted result as well as other portions received from all other clients (operation 322).

Figure 4:
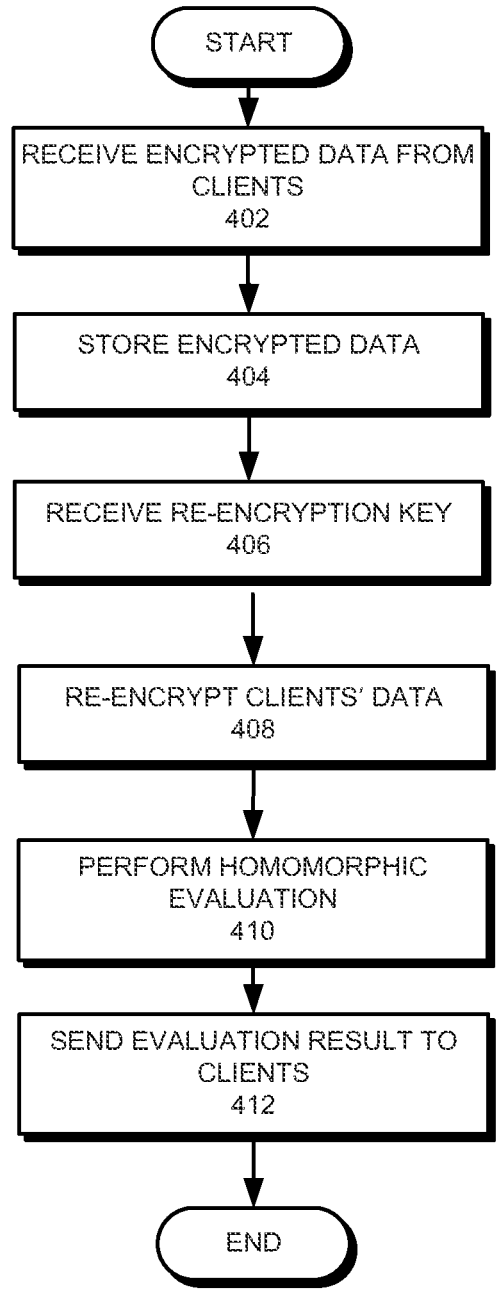
FIG. 4 presents a diagram illustrating an exemplary secure MCC process performed at the cloud, in accordance with an embodiment of the present invention.

FIG. 4 presents a diagram illustrating an exemplary secure MCC process performed at the cloud, in accordance with an embodiment of the present invention. During operation, the cloud receives private data (in encrypted form) from multiple clients (operation 402), and stores the encrypted private data for each client separately (operation 404). Note that the encryption of each client's private data involves the use of a unique, client-specific public/private key pair that the client obtained from a trusted third party. More specifically, each client encrypts its plaintext data with the public key and stores the private key for future use. Subsequently, the cloud receives a re-encryption key from each client (operation 406), and re-encrypts the client's data using the corresponding re-encryption key, thus making a subsequent homomorphic evaluation possible (operation 408). Note that, in one embodiment, the received re-encryption key is generated using the client's private key and a target public key that is published by the trusted third party. The trusted third party also distributes shares of the corresponding target private key among the multiple clients with each user receiving a share of the target private key. After re-encryption, the cloud performs a homomorphic evaluation on the re-encrypted data of the multiple clients (operation 410), and sends the evaluation result to the multiple clients, thus allowing the multiple clients to cooperatively decrypt the evaluation result (operation 412).

The goal of the secure MCC solution is to enable multiple clients, by leveraging the cloud capacity, to perform outsourced computation functions in a secure and private manner. The proposed homomorphic threshold proxy re-encryption scheme introduces proxy re-encryption into homomorphic encryption scheme to achieve homomorphism in the presence of data obtained from multiple clients. Note that the system architecture shown in FIG. 1 and the process shown in FIG. 2 are merely exemplary and should not limit the scope of this disclosure. In general, embodiments of the present invention provide a solution that enables secure MCC. Other system architecture is also possible. For example, the numbers or the location of the clients can be different from what is shown in FIG. 1. In addition, unlike what is shown in FIG. 1, the computation service and the storage service may be provided by different clouds. Moreover, other encryption schemes are also possible as long as they can provide homomorphism for data obtained from multiple clients. For example, the re-encryption key may be generated using a different algorithm.

Computer System

Figure 5:
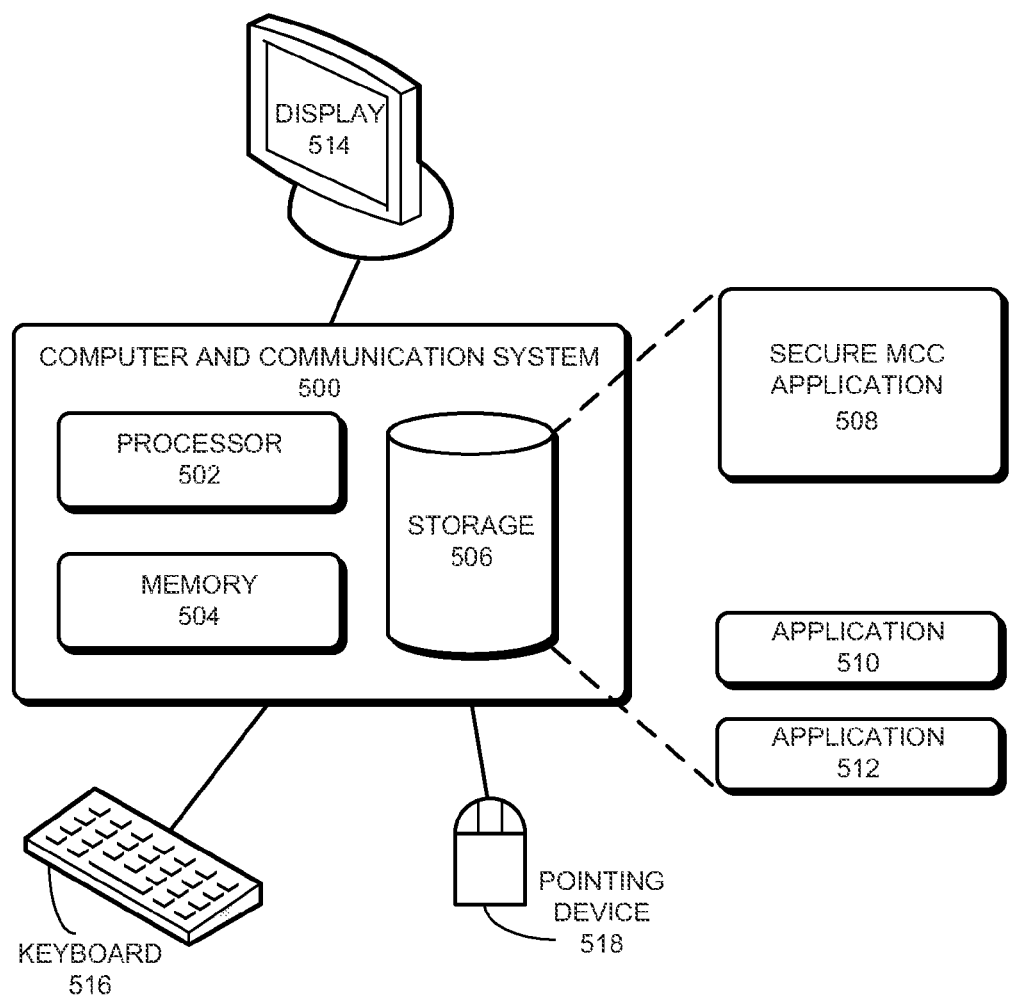
FIG. 5 illustrates an exemplary computer system for performing secure MCC, in accordance with one embodiment of the present invention.

FIG. 5 illustrates an exemplary computer system for performing secure MCC, in accordance with one embodiment of the present invention. In one embodiment, a computer and communication system 500 includes a processor 502, a memory 504, and a storage device 506. Storage device 506 stores a secure MCC application 508, as well as other applications, such as applications 510 and 512. During operation, secure MCC application 508 is loaded from storage device 506 into memory 504 and then executed by processor 502. While executing the program, processor 502 performs the aforementioned functions. Computer and communication system 500 is coupled to an optional display 514, keyboard 516, and pointing device 518.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method, comprising:
receiving, at a computing system, multiple encrypted datasets from multiple clients, wherein an encrypted dataset associated with a client is encrypted from a corresponding plaintext dataset using a unique, client-specific encryption key, wherein the client-specific encryption key is a public key selected from a public/private key pair;
re-encrypting the multiple encrypted datasets to a target format, comprising,
receiving a set of re-encryption keys, wherein a particular re-encryption key corresponding to the client is used to re-encrypt the encrypted dataset associated with the client, wherein the re-encryption key corresponding to the client is generated using a private key selected from the public/private key pair and a target public key published by a trusted third party, wherein the target public key corresponds to a target private key and each client receives a share of the target private key;
evaluating a function based on the re-encrypted multiple datasets to produce an evaluation result; and
sending the evaluation result to the multiple clients, which are configured to cooperatively decrypt the evaluation result to obtain a plaintext evaluation result using shares of the target private key.

2. The method of claim 1, wherein re-encrypting the multiple encrypted datasets involves a homomorphic encryption scheme.

3. The method of claim 1, wherein the function includes a multiplication and/or an addition.

4. A non-transitory computer-readable storage medium storing instructions that when executed by a computer cause the computer to perform a method, the method comprising:
receiving multiple encrypted datasets from multiple clients, wherein an encrypted dataset associated with a client is encrypted from a corresponding plaintext dataset using a unique, client-specific encryption key, wherein the client-specific encryption key is a public key selected from a public/private key pair;
re-encrypting the multiple encrypted datasets to a target format, comprising,
receiving a set of re-encryption keys, wherein a particular re-encryption key corresponding to the client is used to re-encrypt the encrypted dataset associated with the client, wherein the re-encryption key corresponding to the client is generated using a private key selected from the public/private key pair and a target public key published by a trusted third party, and wherein the target public key corresponds to a target private key, and wherein each client receives a share of the target private key;
evaluating a function based on the re-encrypted multiple datasets to produce an evaluation result; and
sending the evaluation result to the multiple clients, which are configured to cooperatively decrypt the evaluation result to obtain a plaintext evaluation result using shares of the target private key.

5. The computer-readable storage medium of claim 4, wherein re-encrypting the multiple encrypted datasets involves a homomorphic encryption scheme.

6. The computer-readable storage medium of claim 4, wherein the function includes a multiplication and/or an addition.

7. A method for use in a cloud computing system, the method comprising:
obtaining, by a first client of a cloud computing system, an encrypted dataset from a plaintext dataset using a unique encryption key;
obtaining, by a second client of a cloud computing system, an encrypted dataset from a plaintext dataset using a unique encryption key, wherein each of the unique encryption keys is a public key selected from a public/private key pair;
storing the encrypted datasets at the cloud computing system;
generating, by the first client, a re-encryption key;
generating, by the second client, a re-encryption key, wherein each of the re-encryption keys is generated based on a private key selected from the public/private key pair and a target public key published by a trusted third party;

transmitting the re-encryption keys to the cloud computing system, thereby allowing the cloud computing system to re-encrypt the encrypted dataset received from the first client and re-encrypt the encrypted dataset received from the second client and generate an evaluation result of a function based on the re-encrypted datasets;

receiving the evaluation result from the cloud computing system;

receiving, from the trusted third party, a share of a target private key corresponding to the target public key; and cooperating among at least the first client and the second client to decrypt the evaluation result to obtain a plaintext evaluation result.

8. The method of claim 7, wherein cooperating among at least the first client and the second client to decrypt the evaluation result comprises:

computing a portion of a decrypted result;

receiving, by the first client, a portion of the decrypted result from the second client; and computing the plaintext evaluation result based on the computed portion and the portion received from the first client.

9. The method of claim 7, wherein the function includes a multiplication and/or an addition.

10. The method of claim 7, wherein each of the re-encryption keys is a homomorphic encryption key.

11. A computer system comprising:
a processor;
a memory;

a receiving module configured to receive multiple encrypted datasets from multiple clients, wherein an encrypted dataset associated with a client is encrypted from a corresponding plaintext dataset using a unique, client-specific encryption key, wherein the client-specific encryption key is a public key selected from a public/private key pair;

a re-encryption module configured to re-encrypt the multiple encrypted datasets to a target format and receive a set of re-encryption keys, wherein a particular re-encryption key corresponding to the client is used to re-encrypt the encrypted dataset associated with the client, wherein the re-encryption key corresponding to the client is generated using a private key selected from the public/private key pair and a target public key published by a trusted third party, and wherein the target public key corresponds to a target private key, and wherein each client receives a share of the target private key;

an evaluation module configured to evaluate a function based on the re-encrypted multiple datasets to produce an evaluation result; and an output module configured to send the evaluation result to the multiple clients, which are configured to cooperatively decrypt the evaluation result to obtain a plaintext evaluation result using shares of the target private key.

12. The computer system of claim 11, wherein while re-encrypting the multiple encrypted datasets, the re-encryption module is further configured to apply a homomorphic encryption scheme.

* * * * *